(12) United States Patent
Eder et al.

(10) Patent No.: US 7,305,059 B2
(45) Date of Patent: Dec. 4, 2007

(54) METHOD AND DEVICE FOR THE CLOCKED OUTPUT OF ASYNCHRONOUSLY RECEIVED DIGITAL SIGNALS

(75) Inventors: Stefan Eder, Grafenau (DE); Gunther Fenzl, Neubiberg (DE)

(73) Assignee: Infineon Technologies AG, Munich (DE)

( * ) Notice: Subject to any disclaimer, the term of this patent is extended or adjusted under 35 U.S.C. 154(b) by 767 days.

(21) Appl. No.: 10/618,378

(22) Filed: Jul. 11, 2003

(65) Prior Publication Data

US 2004/0013093 A1    Jan. 22, 2004

(30) Foreign Application Priority Data

Jul. 19, 2002   (DE) ................................ 102 32 988

(51) Int. Cl.
*H03D 3/24* (2006.01)
*H04L 1/16* (2006.01)
*H04L 7/00* (2006.01)

(52) U.S. Cl. .................. 375/373; 375/219; 375/372

(58) Field of Classification Search ........ 375/219–222, 375/371–373; 379/93.01; 455/73, 84, 86, 455/87

See application file for complete search history.

(56) References Cited

U.S. PATENT DOCUMENTS

| | | | |
|---|---|---|---|
| 4,317,195 A | 2/1982 | Barberis et al. | |
| 5,274,680 A | 12/1993 | Sorton et al. | 375/118 |
| 5,541,955 A * | 7/1996 | Jacobsmeyer | 375/222 |
| 5,699,392 A | 12/1997 | Dokic | |
| 5,784,379 A | 7/1998 | Tan | |
| 6,560,290 B2 * | 5/2003 | Ahn et al. | 375/259 |
| 6,608,829 B1 * | 8/2003 | Johnson | 370/350 |
| 6,754,295 B1 * | 6/2004 | Hartnett | 375/356 |
| 6,829,244 B1 * | 12/2004 | Wildfeuer et al. | 370/412 |
| 2005/0041643 A1 * | 2/2005 | Noguchi et al. | 370/352 |

FOREIGN PATENT DOCUMENTS

| | | |
|---|---|---|
| DE | 100 61 198 A1 | 7/2002 |
| EP | 0 705 051 B1 | 4/1996 |
| WO | WO-01/18790 | 3/2001 |

\* cited by examiner

*Primary Examiner*—Tesfaldet Bocure
(74) *Attorney, Agent, or Firm*—Peter F. Corless; Steven M. Jensen; Edwards Angell Palmer & Dodge LLP

(57) ABSTRACT

A method and device for the uniform output of asynchronously transmitted digital values is provided, including: receiving the digital values in a receiver from a transmission path; outputting the digital values from the receiver on the basis of an output clock for further processing; transmitting the digital values to the transmission path by a transmission device of the receiver; determining the amount of the digital values received by the receiver in relation to the time; adjusting the output clock on the basis of the determined amount in such a way that the digital values are outputted at the frequency with which on time average the receiver receives the digital values; and adjusting a transmission clock of the transmission device to correspond to the output clock of the receiver.

13 Claims, 2 Drawing Sheets

METHOD AND DEVICE FOR THE CLOCKED OUTPUT OF ASYNCHRONOUSLY RECEIVED DIGITAL SIGNALS

FIELD OF THE INVENTION

The present invention relates to a method or a device for the uniform output of asynchronously transmitted digital values with an output clock.

BACKGROUND OF THE INVENTION

In numerous applications there is a need to output digital values as uniformly as possible particularly in analog form, whereby the digital values can arrive at irregular intervals due to the asynchronous transmission. As uniform output as possible is desired particularly with acoustic signals, as they occur for example in telephone communications or the transmission of radio programs. The same applies for multimedia data, such as for example graphic data or combined video and audio data.

As a consequence of the asynchronous transmission no central master clock, on which the various components involved in the transmission can fall back, is available in such a system. Each of the components involved therefore itself produces in such systems the clock necessary for outputting data or for inputting data.

If data are transmitted between two components in such a system, then every effort is made to output the data on the receiver side at the same output frequency as they have been inputted on the transmitter side. In this case however the following problem arises. FIG. 4 shows the example of the situation, in which data D, that are outputted or inputted by the components A, B in analog form, are transmitted bi-directionally between two components A and B via lines P. In this case the component A uses the frequency fA for sending the data D and for outputting received data D. Correspondingly the component B uses the frequency fB. Since in practice the two frequencies fA and fB are never completely the same, this means that after a certain time more data D is transmitted in one direction than in the other. In FIG. 4 the amount of data D transmitted in both directions is illustrated for clarity over the time t. Here it can be seen that seven data elements were transmitted from the component A to the component B, in the opposite direction however only six data elements were transmitted. This means that in the case of the component B in time a data overflow arises, in the case of which more data D are received than outputted, and therefore a data bottleneck develops. In practice this is resolved by the fact that surplus data are eliminated. On the other hand the ease arises that the data D are received by the component A at a lower frequency than they are outputted. With the output of the data D therefore data, which are produced by interpolation according to a method known from prior art, are missing.

SUMMARY OF THE INVENTION

The objective of the present invention is to create a method as well as a device for uniform outputting of asynchronously transmitted data, whereby the problem of data overflow or data under-run can be prevented at low cost and without reduction in the quality of the data output.

According to the invention this objective is achieved by a method and a device for the uniform output of asynchronously transmitted digital values.

According to the invention a receiver determines the amount of the incoming data or digital values in relation to the time and from this produces an output frequency value for outputting the received data, in which the digital values are outputted at the same frequency on average as they are received. This way prevents over the course of the time digital values being accumulated or too few digital values being available for outputting.

The information about how many digital values arrive, in relation to the time, can advantageously be obtained by means of a buffer, in which incoming digital values are stored and again made available for outputting, whereby periods, in which no digital values are received, can be bridged with the digital values from the memory. Such a buffer is necessary with asynchronous transmission anyhow in most cases, since if transmitting for example via an IP-network or generally with packet-based data communication networks the transmission duration can vary, so that some digital values or packets are able to arrive faster and some slower and therefore time gaps can arise between the incoming digital values, which have to be balanced out by means of the buffer described above.

Advantageously at the same time the situation is also considered, in which digital values have been sent by a transmitter to a certain receiver but do not reach the destined receiver. In order not to change the transmission frequency of the other digital values due to digital values which have been lost, possibly resulting in a perceptible degradation of the signal for the receiver or a listener in the case of audio data, the digital values, which were destined for the receiver but have not reached the latter are also considered with the amount of the received digital values. This information is in many cases available anyhow for example with packet-based data communication networks, so that the receiver can accurately output the digital values by means of this information using the frequency, at which they have been received on the transmitter side. The missing digital values can if necessary be substituted by interpolated values. Although the signal quality is reduced as a result of the missing digital values in places, the output frequency for the received digital values is prevented from being set too low by considering the digital values, which have been lost.

If the information about how many digital values have been sent to a certain receiver is reliably available, this information can be accessed directly and exclusively, in order to set the output clock in the receiver.

Advantageously the output clock is produced by an oscillator or generally a clock generator, which even without an adjusting signal also supplies a defined frequency, that advantageously is the same for all components involved in the transmission of the digital values. With the execution of the method according to the invention the frequency of the oscillator only has to be adapted slightly, so that the output clock is in harmony with the clock, by which the digital values have been produced on the transmitter side. The nominal value of the frequency can be maintained already with great precision by simple means, so that necessary de-tuning of the oscillators is only very minimal and therefore not noticed by the receiver of the outputted digital values.

The output clock can be produced by dividing or multiplying an output signal of an oscillator, whereby integral and also non-integral factors are conceivable. The output clock can also be set by changing the factor, keeping the oscillator frequency the same.

Due to the usually only very minimum changes of the output clock necessary the frequency of an operating clock can also be changed with the receiver, which is provided for its operation and from which the output clock is derived. Such an operating clock frequency is generally present if synchronous logic elements and in particular microprocessor systems are provided. The output clock usually will be substantially smaller than the operating clock, which can be divided for producing the output clock.

Advantageously the method embodying the invention is used in systems, where data signals are transmitted bi-directionally, as for example in the case of telephone transmission, where there is a need to output in analog form speech signals received by a receiver or subscriber in digital form, this occurring with an output clock. The same clock is also preferably used by the subscriber to digitize analog signals, in order then to send these out. If a subscriber equipped in this way makes bi-directional connection to another subscriber, where incoming digital values are output as well as analog values digitized and transmitted also with the output clock, synchronization is reached between the clocks of the two subscribers, if either of the two subscribers sets the output clock in accordance with the method according to the invention.

Since the subscribers can change and at least one subscriber must be set up accordingly for execution of the method to synchronize the output clock according to the invention, it can for example be proposed that all subscribers are set up in such a way that they can all execute the method according to the invention and when the connection is built up between two subscribers it is controlled, which of them executes the method for synchronization. Furthermore both subscribers can also execute the method for synchronization according to the invention, whereby in this case it must be ensured, by adjustment of the control system, by which the output clock is set, that the behaviour of the control systems remains stable.

The present invention is suitable in principle for synchronizing a self-clocked system for outputting time-discrete values with an output clock or for time-discrete inputting of values, whereby the system communicates with another self-clocked system, from which it receives data, which can be outputted, or to which it passes on inputted data. Clocked systems are generally systems with their own master clock. Such is the case for example with a device for providing a telephone service via a communication network, if the speech signals produced by the device still have to be coded or decoded for transmission on the data communication network and a separate clock is used for coding or decoding. In this case the received or sent data is processed in the encoder or decoder at a first frequency, which does not necessarily have to be in harmony with that at which conversion takes place in the device between the digital values and the associated analog values. In such a case the device can be synchronized to the clock used in the encoder or decoder by way of the method according to the invention.

BRIEF DESCRIPTION OF THE DRAWINGS

The invention is described in detail below on the basis two preferential embodiments with reference to the attached drawings.

DETAILED DESCRIPTION OF THE INVENTION

Figure 3:
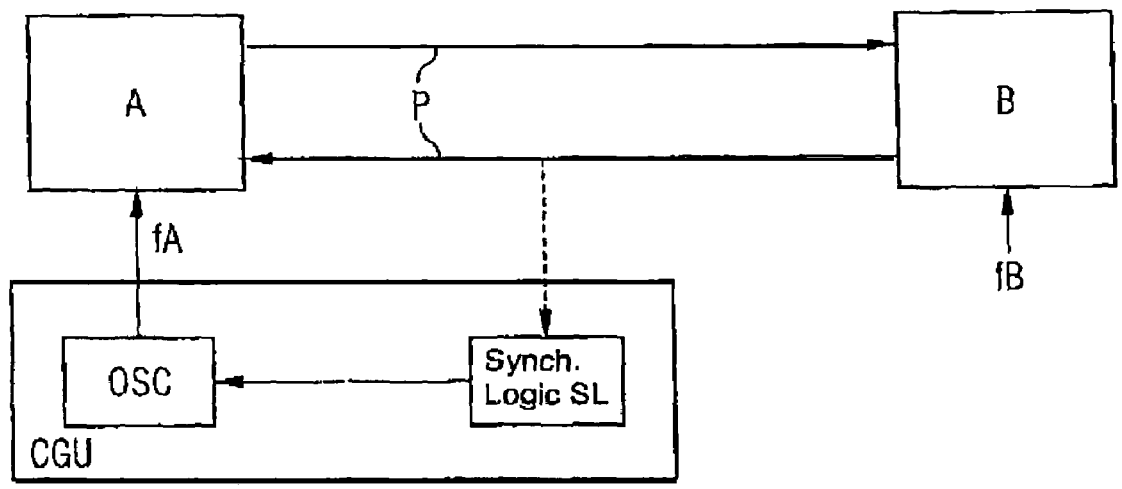
FIG. 3 shows the basic schematic structure of a device for executing the method according to the invention.
Figure 4:
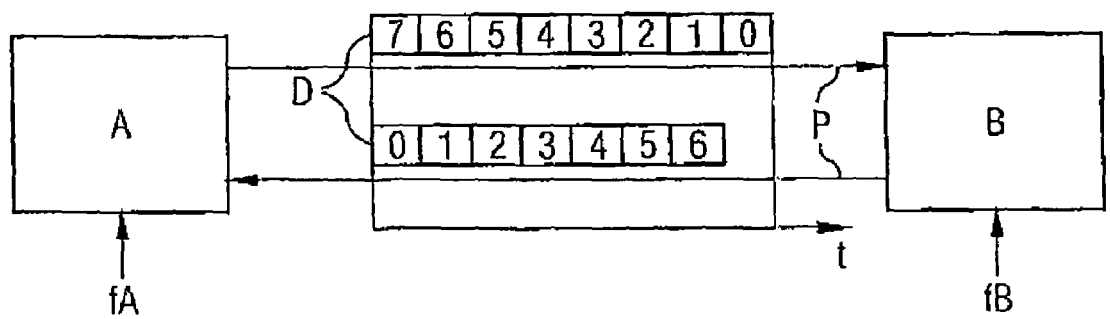
FIG. 4 shows an arrangement for bi-directional data communication from prior art.

In FIG. 3 the basic structure of a device for executing the method embodying the invention is illustrated. Data are transmitted bi-directionally via lines P between two subscribers A, B. The lines P can also be transmission paths, which conduct across a common medium. Sending out data and processing incoming data are executed in the case of the two subscribers A, B in the clock of a subscriber-specific frequency fA or fB. This means for example that in the case of the subscriber A the data, which are received via a line P are processed in the clock of the frequency fA and data is sent out via the outgoing line P. In the application described the data represent speech signals, which are outputted acoustically or inputted by the subscribers A, B. The two subscribers A, B are telephone terminals, between which the speech signals are transmitted in digital form via a data communication network P. In the communication network P the speech signals are asynchronously transmitted in the form of packets, whereby the time duration of the transmission between the two subscribers A, B can vary.

A clock generation unit CGU, which contains a synchronizing logic SL and a controllable oscillator OSC, is assigned to the subscriber A. An input of the synchronizing logic SL is connected to the data transmission line D, received by the subscriber A. The oscillator OSC produces the output clock fA for the subscriber A. The synchronizing logic SL is set up in such a way that it records the amount of the data or digital values for each time unit received by the subscriber A and dependent on this controls the oscillator OSC in such a way that the output clock fA corresponds to the average frequency, at which digital values are received by the subscriber A for outputting. This has the result that on average exactly the same amount of digital values received by the subscriber A are outputted as sent out from the subscriber B to the subscriber A. The output clock fA is therefore synchronized to the output clock fB of the subscriber B. This again has the result that the digital values are also received by the subscriber B on average at the same frequency, as they can be processed or outputted there as analog values.

Figure 1:
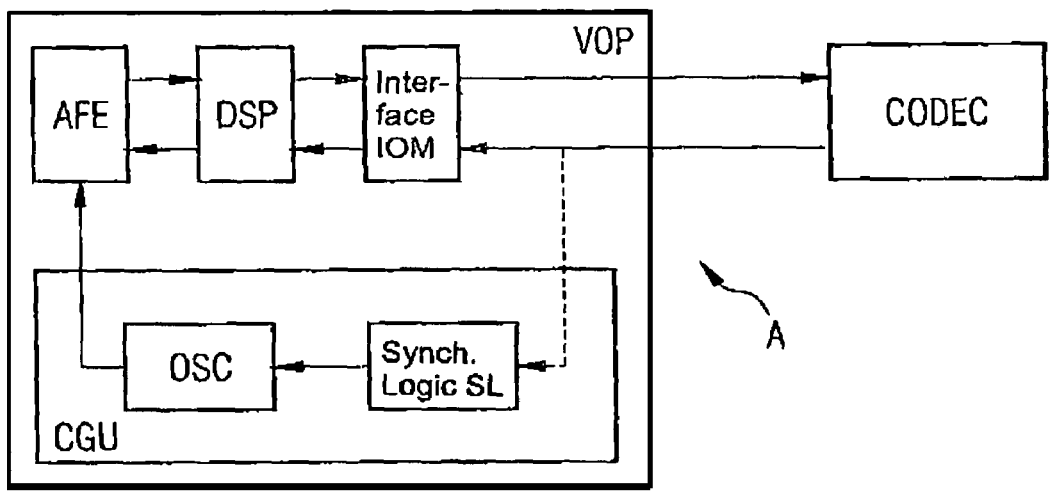
FIG. 1 shows the schematic structure of a device for processing and digitizing audio signals in accordance with a first embodiment of the present invention.

In FIG. 1 the structure of a switching configuration VOP for processing and digitizing audio signals is illustrated in accordance with the first embodiment of the present invention. In the embodiment shown within the switching configuration VOP the analog values are outputted or stored in an analog interface or similar front-end AFE. The analog interface AFE for example can also be connected to a telephone receiver, in order to be able to output speech signals arriving via the data communication network over a loudspeaker and to digitize speech signals spoken into the microphone and send these via data communication network. The analog interface AFE is also connected bi-directionally to a digital signal processor DSP, which processes the digital values in both directions. This for example may be compression or decompression of the digital values. The digital signal processor DSP is further connected to an interface IOM, by means of which the digital values can be outputted or inputted from the outside.

An external component CODEC, which is connected to the interface IOM, is arranged outside the switching configuration VOP. The external component CODEC uses its own clock pulse or processes its own master clock, in order to process incoming or outgoing data, which is independent of the clock in the switching configuration VOP. The component CODEC for example can also have acoustic transducers for outputting or inputting acoustic signals.

The switching configuration VOP also has a clock generation unit CGU with a synchronizing logic SL and a controllable oscillator OSC. As is the case with the switching configuration illustrated in FIG. 3 the oscillator OSC also oscillates in this case without any adjusting operation as a result of the synchronizing logic SL to a nominal frequency and can be de-tuned by the synchronizing logic SL within minute limits. An input of the synchronizing logic SL is connected to an incoming data line. The synchronizing logic SL determines how many digital values are received by the switching configuration VOP over the average time and controls the oscillator OSC in such a way that the incoming digital values are outputted from the analog interface AFE at the frequency, with which they are received over the average time by the switching configuration VOP, whereby a signal of the external component CODEC can also be used by the synchronizing logic SL. Analog speech signals are also digitized by the analog interface AFE at the same frequency and finally fed for transmission via the communication network to the digital signal processor DSP, the interface TOM and the component CODEC. Therefore the clock for the analog interface is synchronized in the switching configuration VOP to the clock, with which the component CODEC operates or with which incoming data have been produced, so that in the case of bi-directional data communication between the switching configuration VOP in accordance with FIG. 1 and the component CODEC no data under-run or data overflow arises in either direction of transmission. The only proviso for this is that one single frequency is also used in the component CODEC for processing both received and sent digital values.

Figure 2:
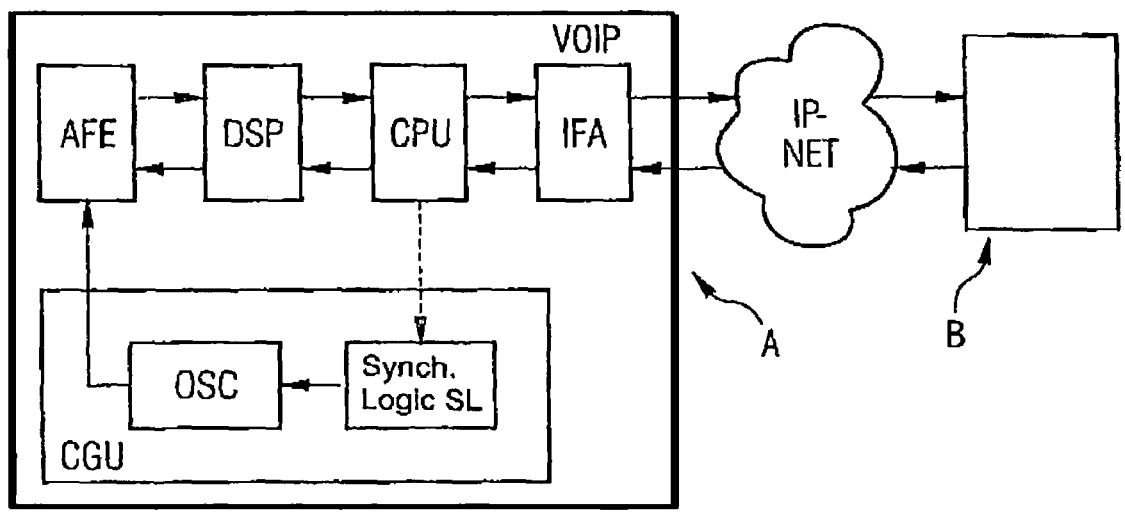
FIG. 2 shows the schematic structure of a device for providing a telephone service via a data communication network in accordance with a second embodiment of the present invention.

In FIG. 2 a switching configuration VOIP is illustrated for providing a telephone service via a communication network IP-Net according to the second embodiment of the present invention. Such a service is also called Voice Over IP. In contrast to the first embodiment here the digital signals are coded or decoded within the switching configuration VOIP. For this purpose the switching configuration VOIP apart from an analog interface AFE has a digital signal processor DSP, a processor CPU of a clock generation unit CGU with an interface IFA. The analog interface AFE, the digital signal processor DSP, the clock generation unit CGU, the synchronizing logic SL and the oscillator OSC correspond to those of the first embodiment, so that reference should be made to the description of these components there. The processor CPU is connected to the digital signal processor DSP and within the switching configuration VOIP prepares the digital signals for transmission via a data communication network IP-Net and transmits or receives these by means of the interface IFA to or from the data communication network IP-network. The switching configuration VOIP represents a first subscriber A.

The communication network IP-Net is also connected to a second subscriber B, which is structured in the same way as the subscriber A.

The input of the synchronizing logic SL in this case is connected to the processor CCU, in which a buffer is provided by means of suitable software. This buffer serves to suppress jitter, which can occur due to the duration for transmitting individual packets varying within the communication network IP-Net. For this purpose the received digital values are stored in the buffer, so that a supply of digital values for analog output is ready and available for a certain length of time. This length of time can amount to 100 ms for example. If this length of time is increased although greater differences in the transmission duration of various digital signals can be bridged, this also leads to longer delay of the received digital values and therefore to reduction of the speech quality.

By means of this intermediate storage the processor CPU can determine how many digital signals over the average time are received within a certain period and pass on this information to the synchronizing logic SL. As in the first embodiment of the present invention the synchronizing logic SL controls the oscillator on the basis of the input received from the processor CPU in such a way that the analog interface AFE outputs the received digital values at the frequency, with which it has received them, so that the level of the buffer can be maintained within a certain range and does not drift away either upwards or downwards.

In this way the frequency of the analog interface in the first subscriber A is synchronized to the frequency of the analog interface in the subscriber B. By the same token such synchronization also takes place in the subscriber B, so that the frequencies for the two analog interfaces AFE are synchronized reciprocally in the two subscribers A, B. This must be considered when designing the control systems for setting the oscillator frequency used by the subscribers of A, B, in order to ensure the behaviour remains stable.

The invention claimed is:

1. A method for the uniform output of asynchronously transmitted digital values, comprising:
   receiving the digital values in a receiver from a transmission path;
   outputting the digital values from the receiver on the basis of an output clock for further processing;
   transmitting the digital values to the transmission path by a transmission device of the receiver;
   determining the amount of the digital values received by the receiver in relation to the time;
   adjusting the output clock on the basis of the determined amount in such a way that the digital values are outputted at a frequency with which on time average the receiver receives the digital values; and
   adjusting a transmission clock of the transmission device to correspond to the output clock of the receiver.

2. The method according to claim 1, wherein the digital values which were destined for the receiver, but have not reached the receiver are considered as received digital values when determining the amount of the digital values received from the receiver.

3. The method according to claim 2, wherein information about the amount of the digital values destined for the receiver is extracted from information data packets which are produced by the transmission device sending out the digital values destined for the receiver.

4. The method according to claim 1, wherein the output clock is derived from an output signal of an oscillator supplying a nominal frequency which is influenced by means of an adjusting operation.

5. The method according to claim 4, wherein the output signal of the oscillator is the operating clock for the receiver.

6. The method according to claim 4, wherein the output clock is produced by dividing the output signal of the oscillator.

7. The method according to claim 1, wherein the digital values are transmitted bi-directionally between a first receiver and a second receiver and both of the receivers adjust their output clock for received digital values dependent on the amount of digital values in relation to the time, which in each case have been sent out by the other receiver.

8. The method according to claim 7, wherein both of the receivers adjust both the output clock for received digital values and the transmission clock for sent digital values.

9. The method according to claim 1, wherein the digital values are outputted in analog form.

10. The method according to claim 1, wherein the digital values are speech signals, which are transmitted in a system for providing a telephone service via a communication network.

11. The method according to claim 1, wherein the receiver receives the digital values from a self-clocked data decoder or data encoder.

12. A device for the uniform output of asynchronously transmitted digital values, comprising:
   a receiver to receive the digital values from a transmission path and to output the digital values on the basis of an output clock for further processing;
   a transmitter to transmit the digital values to the transmission path; and
   a clock generation unit to determine the amount of digital values received by the device in relation to the time, wherein the clock generation unit is configured to adjust the output clock dependent on the determined amount in such a way that the digital values are outputted at the frequency, with which on time average digital values are received by the receiver, and wherein a transmission clock of the transmitter corresponds to the output clock of the receiver.

13. A bi-directional data transmission system, comprising:
a first receiver, and
a second receiver coupled to the first receiver via a transmission path to receive asynchronously transmitted digital values from the transmission path and to output the digital values on the basis of an output clock for further processing, wherein the first receiver and the second receiver each comprise:
a transmitting device to transmit digital values to the transmission path on the basis of a transmission clock corresponding to the output clock of the receiver; and
a clock generation unit to generate the output clock of the receiver,
wherein for at least one of the first receiver and the second receiver, the clock generation unit is configured to determine an amount of the digital values received by the at least one of the first receiver and the second receiver in relation to time and to adjust the output clock dependent on the determined amount such that the digital values are outputted at a frequency with which on time average the digital values are received by the at least one of the first receiver and the second receiver.

* * * * *